Aug. 5, 1958 H. EPSTEIN ET AL 2,846,666

MAGNETOSTRICTIVE PULSE DELAY APPARATUS

Original Filed June 25, 1952

INVENTOR.
HERMAN EPSTEIN
OSCAR B. STRAM

BY

Ralph K. Bone

AGENT

United States Patent Office 2,846,666

Patented Aug. 5, 1958

2,846,666

MAGNETOSTRICTIVE PULSE DELAY APPARATUS

Herman Epstein, West Chester, and Oscar B. Stram, Paoli, Pa., assignors to Burroughs Corporation, Detroit, Mich., a corporation of Michigan Original application June 25, 1952, Serial No. 295,577. Divided and this application April 11, 1956, Serial No. 577,493

1 Claim. (Cl. 340—173)

This application is a division of application Serial No. 295,577, filed June 25, 1952.

The disclosed invention relates generally to improvements in pulse delay devices and more particularly to improvements in pulse delay devices utilizing magnetostrictive material to effect the pulse delay.

Pulse delay devices are used in computer circuitry, telephone circuitry, servo mechanisms and in many other types of circuits and apparatus. Various types of delay means have been developed, including mercury delay lines, quartz delay lines, inductance-capacitance delay lines, magnesium alloy delay lines and magnetic delay lines. Each of these, however, has characteristics which limit its use in certain areas of application. For example, the useful delay that can be achieved may be limited by the bulk or the extent of the required apparatus; also, it may be impossible to derive output signals at any point except the terminus of the delay line.

The present invention makes use of a delay line of magnetostrictive material in tubular form along which acoustic waves are propagated at a finite velocity with relatively low attenuation, responsive to the application of electrical pulses to a transmitting transducer associated therewith. Among other advantages this form of delay line allows a propagated wave to actuate a plurality of receiving transducers at as many points along the line as may be desired, without destruction of the wave. By taking advantage of such an arrangement of spaced receiving transducers the present invention, in one embodiment thereof, provides a serial input—parallel output pulse distribution system, later described in detail herein.

It is an object of the invention to provide an improved pulse delay line utilizing magnetostrictive material.

Another object is to provide a delay line having read-in and read-out means constructed and arranged for spacing serially applied input pulse signals in suitable relationship for parallel read-out.

Another object is to provide means for non-destructive parallel read-out of serially occurring pulse signals.

A further object is to provide in pulse conversion apparatus a group of transducers spaced along a delay line in dependence upon the velocity of propagation of an acoustic wave along the line for the transferral of signals between transducers in selected time relationship.

In the figures, Figs. 1–3 correspond, respectively, to similarly numbered figures in the parent application.

Figure 1:
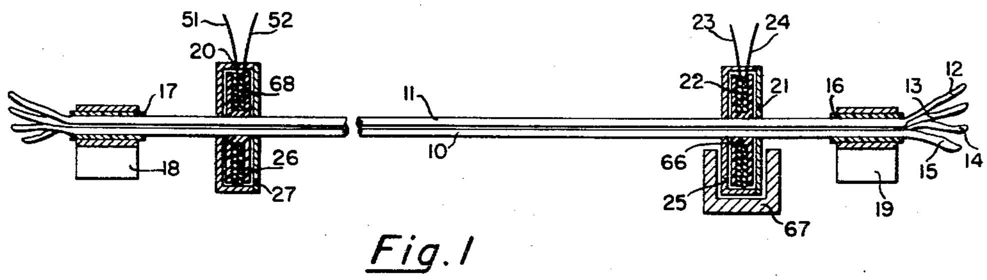
Fig. 1 shows a magnetostrictive delay line, in accordance with the principals of the invention, employing a transmitting and a single receiving transducer.

Referring now to the embodiment of the invention illustrated in Fig. 1, tubing 10, by way of example, has an outside diameter of .125", a wall thickness of .004", and is formed of some magnetostrictive material such as nickel. The length of the tube is selected in accordance with the time delay desired and may vary from a few inches to several feet. The tube is slotted along its length in order to reduce eddy currents. In the embodiment of the invention shown in Fig. 1 the slot 11 may have a width of about .032". It may be noted that when tubes of substantially smaller diameter are used no slots are required, since the eddy currents are of a much lower magnitude. The smaller diameter tubing has disadvantages, however, such as poorer rigidity.

Suppression of the effect of echos may be achieved in this configuration by making four slits in each end of the nickel tubing, thus forming four leaves, for example leaves 12, 13, 14 and 15 at the right of Fig. 1. Irregularity in the length of the slits and kinks in the leaves may be made use of to set up reflections according to different modes of vibration which in the aggregate tend, statistically, to cancel one another and leave only a low amplitude noise at locations along the line. As a further aid in reducing uncompensated reflected waves along the line a portion of the nickel tube adjacent the terminal leaves thereof may be coated with an echo suppression material such as beeswax coating 16, indicated at the right of Fig. 1 and similar coating 17 at the left of the figure. It is to be noted that if tubing of a smaller diameter than that above referred to is used, the difficulty of forming leaves in the ends thereof is increased. In this case the application of beeswax to the ends of the tubing may, of itself, be sufficient to produce satisfactory echo suppression. Other known methods of echo suppression also may be used. Clamps 18 and 19, fitting over the beeswax coating, where used, provide a means for securing the pulse delay line in a desired position on a base (not shown).

Input transducer 20 and output transducer 21 are substantially identical in construction in this embodiment of the invention with the exception that, preferably (but not necessarily), a magnetic biasing source is provided in connection with transducer 21. Referring specifically to output transducer 21, coil 22 is wound in the form of a solenoid and positioned so as to encircle nickel tubing 10. Conductors 23 and 24 are the terminals of winding 22. Winding 22 is wound on an insulating bobbin 66 encased on every side except its inner cylindrical surface by annular shell 25 of magnetic material which provides a path external to tubing 10 for the flux generated by the referred to magnetic biasing source. Member 25 preferably is of a material having good high frequency magnetic characteristics, that is, high permeability and low losses at such frequencies. The various types of ferrite materials have such characteristics. Other magnetic materials having suitable high frequency characteristics may be used. A permanent magnet 67 preferably is provided in connection with output or receiving transducer 21 as a source of magnetic bias to create an axial magnetic flux in that portion of the magnetostrictive tubing encircled by the transducer.

Input transducer 20 comprises a winding 26, an insulating bobbin 68, and a magnetic circuit element 27 similar, respectively, to winding 22, bobbin 66, and member 25 of output transducer 21.

Figure 4:
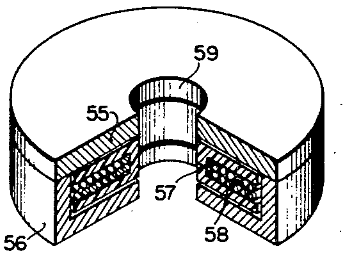
Fig. 4 is a perspective view, partly in section, of a transducer adapted for use with the line of Fig. 1, and corresponds to Fig. 6 of the parent application.

Fig. 4 is a more detailed showing in perspective form, of the structure of the transducer employed in the embodiments of the invention illustrated herein and will be further described without reference to the particular function, transmitting or receiving, which it performs. For purposes of assembly the magnetic casing of the transducer which, as noted, preferably is of a ferrite material, is made in two parts 55 and 56 which, after assembly, are held together by some adhesive means such as polystyrene. The coil in one embodiment is composed of 250 turns of A. W. G. #40 wire. The overall outside diameter is 11/16". The thickness of the walls of the ferrite casing is 1/16". The axial length of the transducer is about 13/64". Aperture 59 provides a close fit for the transducer when assembled on tubing 10. It will be appreciated that the materials and the dimensions given herein for the transducer refer to but one engineering design of such a transducer and may vary within wide limits.

Figure 2:
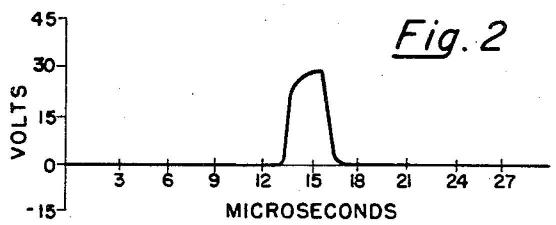
Fig. 2 is a wave diagram showing a single electrical pulse input to a transmitting transducer.
Figure 3:
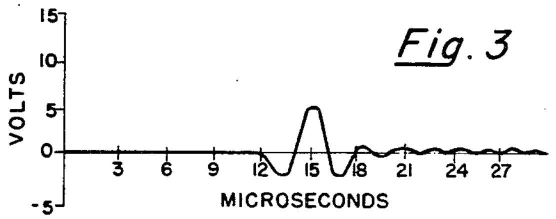
Fig. 3 is a wave diagram showing a single electrical pulse from a receiving transducer.

In the structure of Fig. 1 assume that a 30 volt pulse, shown in Fig. 2, having a duration of from 1 microsecond to 3.5 microseconds is impressed on the terminals 51 and 52 of input transducer 20. The change of magnetic flux occurring within the nickel tubing causes an elastic disturbance, propagated in both directions along the tube. The propagation towards the left end of the tubing, as seen in Fig. 1, either is substantially damped out due to the beeswax coating or it creates random reflections from the leaves formed at the end of the tubing, which have a negligible net effect. The propagation to the right, however, passes through that portion of the nickel tubing which also acts as a path for the magnetic flux of the permanent magnetic biasing means 67, to cause a change in the magnetic flux passing through the nickel tubing. This change in magnet flux induces a voltage in winding 22 of transducer 21 which can be detected or utilized by known means. The magnitude of this induced voltage may be of the order of 0.5 volt, as shown in Fig. 3.

In the arrangement of Fig. 1 the time delay line can be made variable by varying the distance between the input transducer 20 and the output transducer 21.

Figure 5:
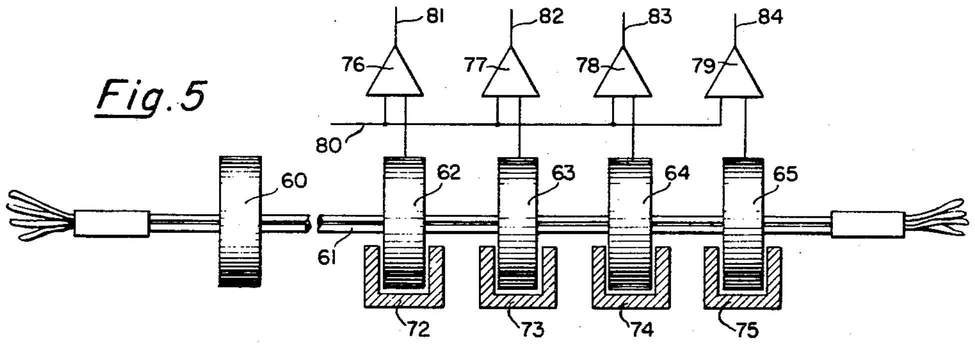
Fig. 5 shows a magnetostrictive delay line employing a single transmitting transducer and a plurality of receiving transducers, and corresponds to Fig. 7 of the parent application.

Fig. 5 shows an embodiment of the invention whereby pulses applied serially as an input to a transmitting transducer associated with a tubular magnetostrictive element may be read out in parallel from a plurality of receiving transducers associated with said element. The tubular element and the transducers may be generally similar to the corresponding members shown in and described in connection with Figs. 1 and 6 respectively.

In the arrangement of Fig. 5 signals in the form of a sequence of pulses spaced in time either uniformly or according to a selected pattern are applied to transmitting or input transducer 60 to provide a sequence of acoustic waves in tubular element 61 for propagation therealong. Due to the uniform velocity of propagation in the tubing the spacing, along element 61, of portions of like phase of these waves will correspond to the spacing in time of the input pulses. Receiving or output transducers 62, 63, 64 and 65 are so positioned along element 61 that portions of similar phase of successive acoustic waves arrive at the respective locations thereof at the same instant.

The output transducers, as described, preferably have associated therewith individual means for magnetically biasing tubular element 61 at their respective locations. Thus, permanent magnets 72, 73, 74 and 75 are respectively associated with output transducers 62, 63, 64 and 65. The electrical pulse outputs of these transducers resulting from the passage of acoustic waves thereby are respectively applied as inputs to gate circuits 76, 77, 78 and 79. A second input to each gate circuit, for example a computer timing pulse, is applied by way of lead 80, common to all gate circuits. Outputs from gate circuits 76—79, resulting from coincidence of two inputs thereto, appear on leads 81, 82, 83 and 84 respectively.

In operation, assuming by way of illustration a sequence of four pulses, spaced in time, to be applied to input or transmitting transducer 60, four acoustic waves will be initiated in element 61 and will be propagated therealong with portions of like phase, for example, positive peaks, spaced along the line according to the time spacing of the input pulses. If output transducers 76 to 79 are suitably located, as described above, the peak of the first wave will arrive at output transducer 65 at the same instant that the peak of the second wave arrives at transducer 64, and that the peaks of the third and fourth waves arrive at transducers 63 and 62, respectively. Each wave will induce a voltage pulse in the output transducer at which it arrives with the result that at a single instant each of the transducer connected input leads to gate circuits 76 to 79 has a signal applied thereto. For read-out, a timing pulse applied to lead 80 supplies the necessary second input to each of the gate circuits and results in simultaneous pulse outputs therefrom.

The embodiments of the invention disclosed herein are by way of illustration and not of limitation. The limits of the invention are defined in the appended claim.

What is claimed is:

Pulse control apparatus comprising: an elongated tubular shaped element of magnetostrictive material, first transducer means magnetically coupled to said element and responsive to an applied sequence of electrical pulses to generate a similar sequence of acoustic waves therein for propagation therealong, said tubular element being slotted longitudinally to reduce modification of said acoustic waves during propagation thereof, said waves existing in said element in spaced relationship corresponding to the spacing in time of said electrical pulses, a plurality of second transducer means magnetically coupled to said element and responsive to acoustic waves in the element to derive electrical pulses therefrom, the spacing of said second transducer means along said element likewise corresponding to the spacing in time of said electrical pulses whereby portions of like phase of successive acoustic waves appear simultaneously at the locations of successive ones of said second transducer means, and means for the simultaneous utilization of electrical pulses simultaneously derived by different ones of said second transducer means.

References Cited in the file of this patent

UNITED STATES PATENTS

| | | |
|---|---|---|
| 2,403,561 | Smith | July 9, 1946 |
| 2,495,740 | Labin, et al. | Jan. 31, 1950 |

OTHER REFERENCES

"Magnetostrictive Sonic Delay Line" (Epstein, et al.), Review of Scientific Instruments, vol. 24, issue 3, pages 231, 232. Published March 1953. (Copy in Div. 42.)

"Magnetostrictive Delay Line" (Bradburd) Electrical Communications, vol. 28, pp. 46–53 March 1951. (Copy in Div. 42.)

"Magnetostriction Storage for a High Speed Digital Computer" (Millership, et al.) British Journal of Applied Physics, vol. 2, p. 304 October 1951. (Copy in Div. 42.)